(12) United States Patent
Miller et al.

(10) Patent No.: US 6,435,325 B1
(45) Date of Patent: Aug. 20, 2002

(54) SEGMENTED LOCKING RETAINER FOR ONE-WAY CLUTCH BEARINGS

(75) Inventors: John R. Miller, Jackson; Jerome Mis, Britton, both of MI (US)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 09/628,826

(22) Filed: Jul. 31, 2000

(51) Int. Cl.⁷ .............................................. F16D 41/064
(52) U.S. Cl. ..................... 192/45; 192/103 C
(58) Field of Search .................. 192/37, 38, 41 R, 192/45, 45.1, 54.52, 79, 93 R, 103 C, 107 T; 188/82.8, 82.84

(56) References Cited

U.S. PATENT DOCUMENTS 1,724,983 A * 8/1929 Weiss ........................ 192/45
1,857,252 A * 5/1932 Miller et al. .................. 188/30
1,942,909 A * 1/1934 von Thungen ............... 192/45
5,651,438 A * 7/1997 Papania ....................... 192/45

FOREIGN PATENT DOCUMENTS

DE          41 28 812 A1 * 3/1993 ................. 192/45

* cited by examiner

Primary Examiner—Richard M. Lorence
(74) Attorney, Agent, or Firm—Brinks Hofer Gilson & Lione

(57) ABSTRACT

An overrunning roller/ramp clutch assembly is disclosed which has a cylindrical drive and driven member. Between the surfaces of these members, a plurality of segmented retainers, each containing a bearing, is located. Each of the retainers defines a ramped surface for engagement with the bearings. A connector interconnects all of the retainers together and causes the retainers to circumferentially move in unison with one another.

34 Claims, 3 Drawing Sheets

SEGMENTED LOCKING RETAINER FOR ONE-WAY CLUTCH BEARINGS

BACKGROUND OF THE INVENTION

1. Field of the Invention

The present invention relates to a clutch bearing assembly which engages upon torque being applied by an input member when rotating in one direction, and acting as a rolling element anti-friction bearing when the input member rotates in the opposite direction. More specifically, the present invention relates to a one-way clutch assembly of a roller/ramp variety and the mechanism by which rollers are retained and biased in the assembly.

2. Description of the Prior Art

One-way clutch bearing assemblies are used in a wide variety of applications. One possible application is use in a paper copier or other low torque applications. During operation of a copier, it is often desirable to disconnect the drive shafts or rollers of the copier from the drive train. When disconnected, the paper feeding shafts can rotate freely with respect to the drive train and, accordingly, they are free to rotate with regard to the speed of the drive train. At other times, it is preferred that the paper feeding elements of the copiers automatically lock to the drive train whenever there is a relative disproportional rotation between the paper drive rollers and the input member from the drive train. The above mentioned clutch assemblies have also been provided where a clutch assembly transfers torque in two directions and where the torque can be transferred in two directions.

In one type of clutch assembly, concentric driving and driven members are provided with a driving member having axial surfaces which face toward another member. Upon each surface, a roller is loosely held. The assemblies are referred to as roller/ramp clutch assemblies. The rollers are initially responsive to acceleration of the driving member and when the rotational acceleration of the driving member occurs, the inertia of the rollers causes them to move along the surfaces toward a side edge of the surfaces. At the side edge, the distance between the surfaces and the driven member is less than the diameter of the roller and the roller contacts the driven member, becoming engaged or locking in the wedge fault between the axial surfaces of the drive member and the circumference of the driven member. In some varieties, the rollers can move along the axial surface to either side. In other types, the engagement of the driven member is only possible by movement of the roller to one side of the surface.

In the later systems, however, complex mechanisms are used to retain the rollers into the grooves. The mechanisms have also generally failed to ensure that the rollers will engage between the driving and driven members at the same time. Failure to provide simultaneous engagement results in disproportionate stresses being applied to the rollers, the driven members, and the driving member. Additionally, non-simultaneous engagement of the rollers has the effect of making the engagement and disengagement more noticeable during the operation of the copier or other device.

Prior designs of roller/ramp clutch assemblies have also used a common biasing member to bias all of the rollers to their non-engaged positions. As a result, greater biasing forces are required and the failure of the biasing member results in the assembly functioning improperly. It is the later type of assembly that the present invention particularly relates.

In view of the foregoing limitations and shortcomings of the prior art devices, as well as other disadvantages not specifically mentioned above, there exists a need in the art for an improved roller/ramp clutch assembly. The primary object of the current invention is to provide a one-way clutch which is relatively simple in construction and yet has both the function of a one-way clutch and the function of a roller bearing. Therefore, as compared to the conventional arrangement using a separate radial bearing, the inventive arrangement achieves decreases in axial dimension, weight and cost, and is suitable particularly for applications having limitations of size, weight and cost. Further, standard bearing rings can be used as the inner and outer members either intact or by applying more or less processing thereto; which is very advantageous from the standpoint of cost.

SUMMARY OF THE INVENTION

Briefly described, these and other objects are accomplished according to the present invention by providing a one-way clutch assembly having a roller/ramp design. The assembly includes independently rotatable inner and outer bearing race members, either of which can function as a driving or driven members. The races are opposing cylindrical surfaces, are concentric about a central axis, and define a gap therebetween.

Formed in at least one of the cylindrical surfaces is a raceway for receiving the rolling elements, in this case ball elements.

Located between the inner and outer races are a plurality of ball elements, each ball element being located within the bearing raceway. A series of segmented retainers are circumferentially disposed between the ball elements so that they can all rotate about a central axis independently of the other ball elements. A connector circumferentially interconnects all of the retainers so that they can rotate about a central axis independently of the inner and outer races. By utilizing the connector, the retainers can all substantially move circumferentially in unison and, therefore, the ball elements can engage and disengage between the members in unison.

The segmented retainers feature a "U" shaped open groove, which forms a pair of ramps for engaging an adjacent ball element when the relative rotation between race members is in one direction. As the rollers or bearings move up the ramps, the segmented retainer and the engaging ball elements wedged between the races. This action results in torque being transferred between the inner and outer race members. This can be used as a brake when one race member is coupled to a ground structure, or to transfer rotational torque to another machine element. The ball elements are also independently biased by the connector element which is coupled to the rotating segmented retainers. In one embodiment, the biasing is provided by resilient tabs that engage the surface of the ball elements. In another embodiment, the ball elements are biased by engagement with the supported segmented retainer.

Additional benefits and advantages of the present invention will become apparent to those skilled in the art to which the present invention relates from the subsequent description of the preferred embodiment and dependent claims, taken in conjunction with the accompanying drawings.

DETAILED DESCRIPTION OF THE PREFERRED EMBODIMENTS

Figure 1:
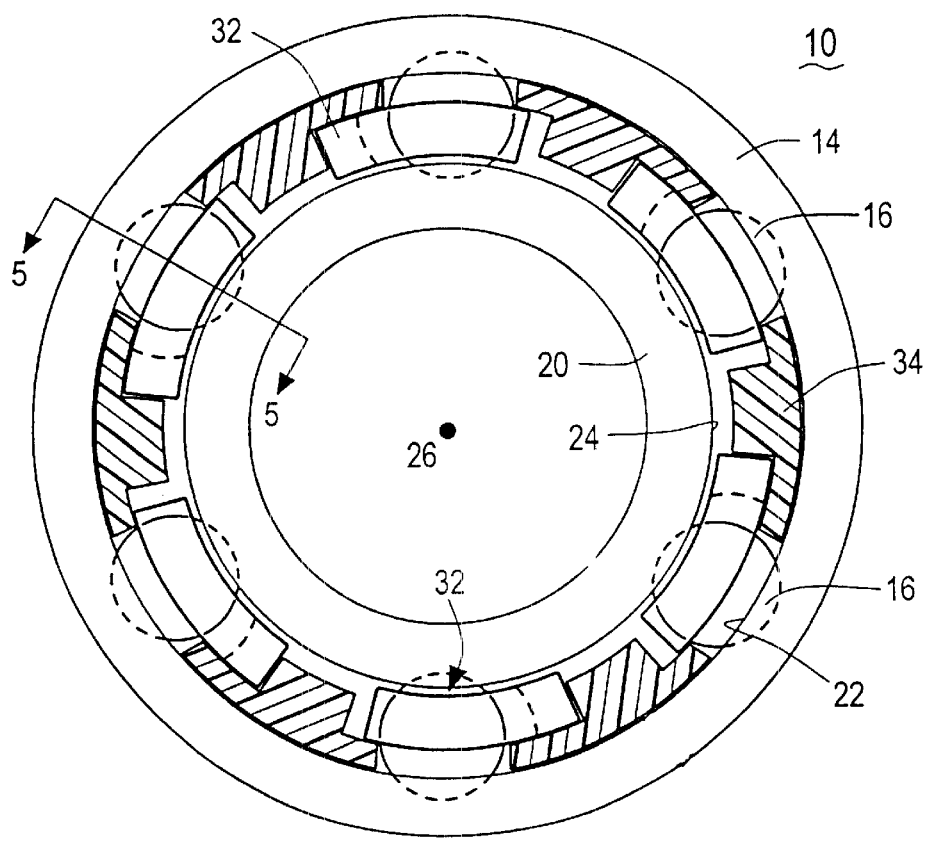
FIG. 1 is a cross-sectional view illustrating the embodiment of the one-way clutch bearing assembly of the present invention in it's disengaged position.

Referring now in detail to the drawings, there is shown in FIG. 1 an assembly 10 embodying a outer race 14 supported by bearing elements 16 for rotation about an inner race 20 of the assembly 10.

Respectively formed in the outer and inner races 14 and 20 are a pair of opposed cylindrical surfaces 22 and 24 which are herein referred to as outer cylindrical surface 22 and inner cylindrical surface 24. Since the outer race 14 and the inner race 20 are mounted for independent rotation about a common axis 26, the opposed cylindrical surfaces 22 and 24 are likewise independently rotatable about that axis 26 and are concentric with respect to one another.

Figure 2:
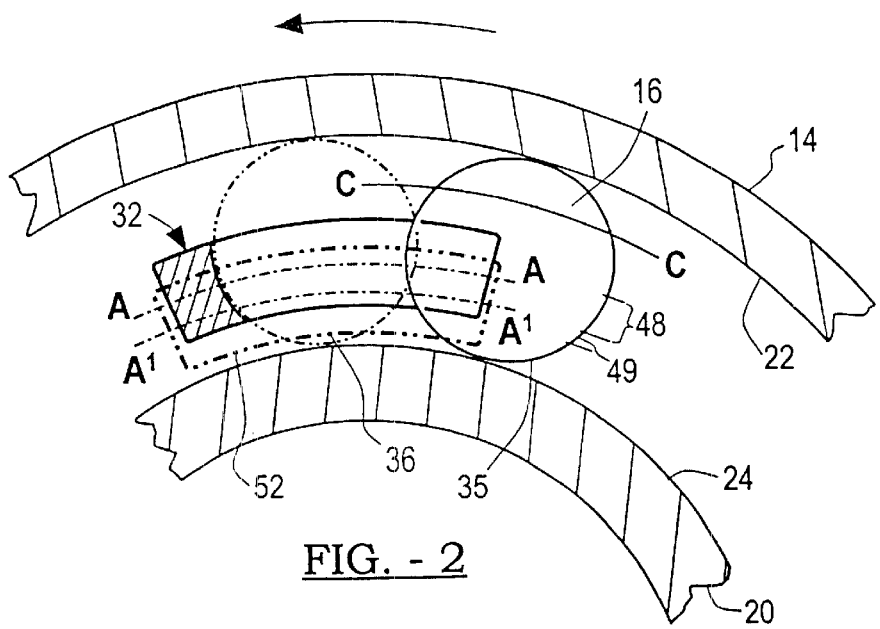
FIG. 2 is a partial section view of the embodiment of the present invention showing the bearing in both the engaged and unengaged condition.

A series of axially oriented segmented retainers 32 are disposed between the cylindrical surfaces 22 and 24. Disposed within the segmented retainers 32, are bearing elements 16. As seen in FIG. 2, the bearing elements 16 are moveable within the segmented retainer 32 between a first unlocked position 35 and a second locked position 36. As shown, when the bearing elements 16 translate from unlocked position 35 to locking position 36, the segmented retainer 32 is translated radially inwardly toward cylindrical surface 24.

As further seen in FIG. 2, segmented retainer 32 has a datum as defined by A—A. When the bearing element 16 is in the unlocked position 35, datum A—A is a first distance from a center datum C—C of bearing element 16. As bearing element 16 translates to the locked position 36 the segmented retainer 32 translates toward one of the cylindrical surfaces 22 and 24. Datum A—A translates to position $A^1$—$A^1$ which is a different distance from center datum C—C of bearing element 16. It must be noted that the translation of the position of datum A—A to $A^1$—$A^1$ must be gradual so bearing element 16 does not jump out of the segmented retainer 32. This also aids in the disengagement of the bearing elements 16.

Figure 3A:
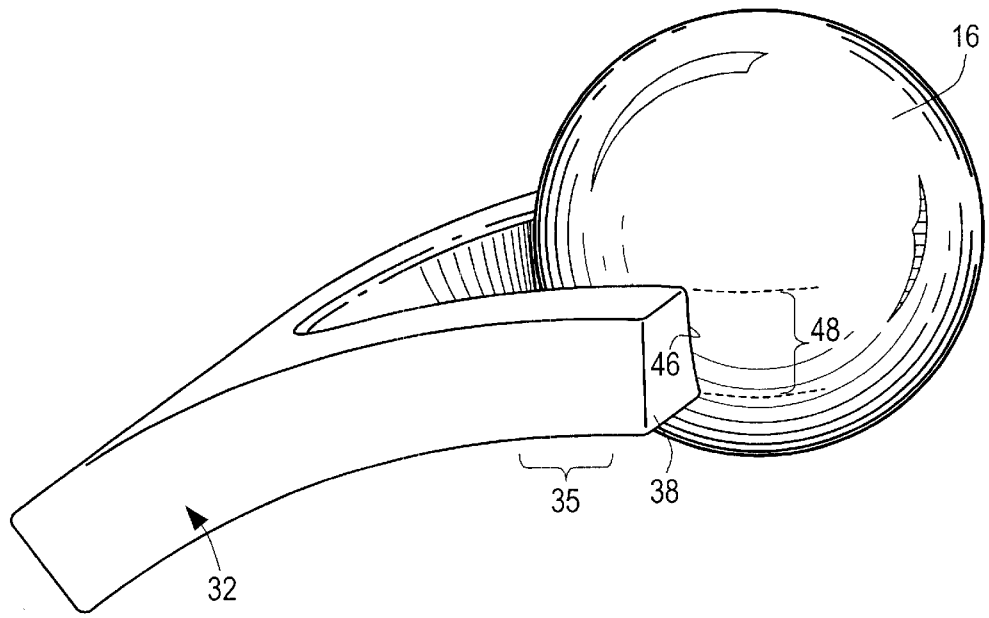
FIGS. 3a, 3b are a partial view of the ball element associated segmented retainer in the disengaged position and engaged position respectfully.
Figure 3B:
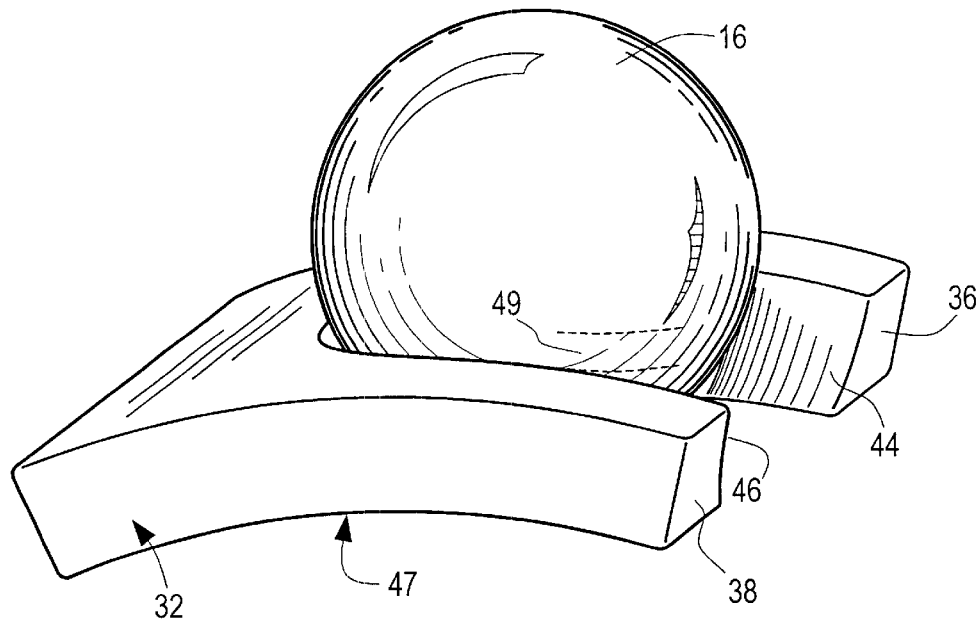

As best seen in FIGS. 3a and 3b, the bearing element 16 is disposed between a pair of generally parallel arm members 36 and 38 of the segmented retainer 32. Each of the arm members 36 and 38 have spaced side surfaces 44 and 46. The surfaces 46 and 44 of the segmented retainer 32 define a radius which conforms to portions of the surface of bearing element 16. As seen in FIG. 3a, when the bearing element 16 is in its unlocked position 35, the surfaces 46 and 44 force the bearing element 16 to "ride up" the surfaces 44 and 46, causing the bearing element 16 to move radially outward relative to axis. As best seen in FIG. 3b, when the bearing element 16 is in its locked position 36, the inner radial surfaces 44 and 46 of the segmented retainer 32 has a surface radius which conforms to the medial portion 49 of the bearing element 16. When the bearing element 16 translates from its unlocked position 35 to its locked position 36, the segmented retainer 32 is forced radially into one cylindrical surface 24. The change in curvature over the equidistantly spaced surfaces 46 and 44 is gradual, allowing for easy translation of bearing element 16 between arm members 36 and 38.

Figure 4:
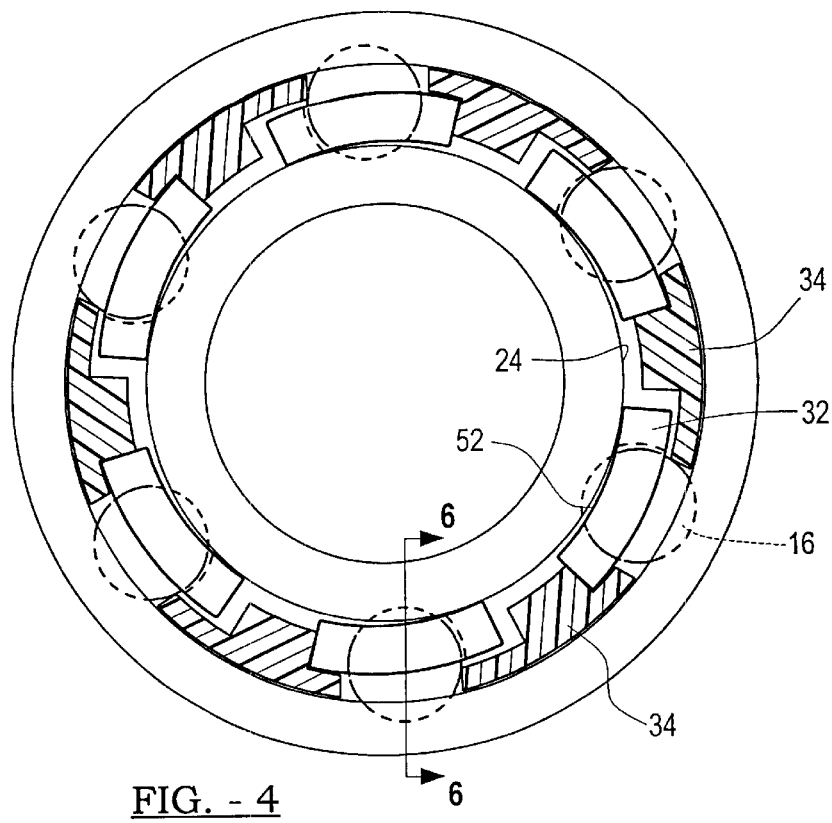
FIG. 4 is a cross-sectional view of the ball element and associated segmented retainer in the engaged position.

As best seen in FIG. 4, when bearing element 16 is in its engaged position within the segmented retainer 32, the retainer's lower surface 52 is engaged onto the cylindrical surface 24 of inner race 20, thus providing a torque transferring mechanism. Further shown in FIG. 4, connector element 34 ensures that all of the bearing elements 16 are translated from the unlocked position 35 to locked position 36 of their respective segmented retainers 32 at the same time. Connector element 34 also ensures that the bearing elements 16 are transferred from the locked position 36 to the unlocked position 35 simultaneously.

Figure 5:
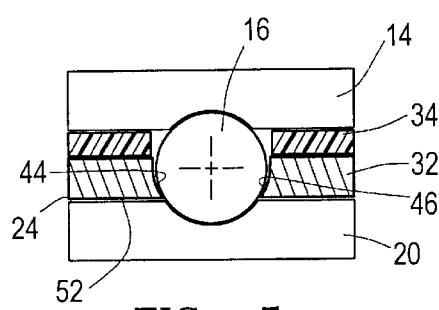
FIG. 5 is a cross-sectional view of the retainer as shown through Section 5—5 of FIG. 1.

FIG. 5 shows a cross-sectional view of the one-way clutch of the current invention shown in FIG. 1 through line 5—5. As can be seen, surfaces 46 and 44 of segmented retainer 32 have radii which conform to the lower portion 48 (see FIG. 3a) of the bearing element 16 and the bearing element 16 is always in contact with the races 14 and 20 disposed on the opposing cylindrical surfaces 22 and 24. Although shown as curved surfaces, these races can take any form as known in the art.

Figure 6:
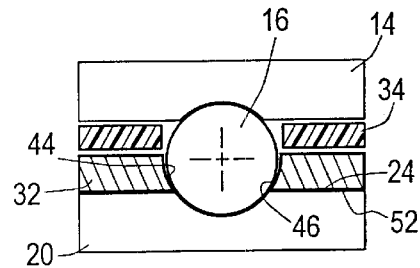
FIG. 6 is a cross-sectional view of the clutch assembly of the current invention through Section 6—6 of FIG. 4.

FIG. 6 shows a cross-sectional view of the one-way clutch as depicted in FIG. 4 through cross-section 6—6. The clutch is shown in its engaged position. Internal surfaces 44 and 46 of segmented retainer 32 are shown having a radius, which conforms to the medial portion 49 of bearing element 16. Retainer lower surface 52 of the segmented retainer 32 is shown engaging the cylindrical surface 24 of the inner race 20. As can be seen, the bearing element 16 is always in contact with the upper and lower races 14 and 20.

Figure 7:
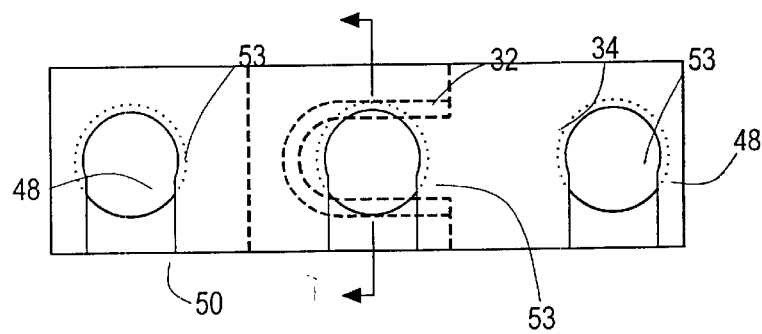
FIG. 7 depicts the connecting element showing its interconnection with the segmented retainer.

Depicted in FIG. 7 is a top view of the connector 34. The connector 34 defines a plurality of holes 53 which allow the bearing elements 16 to engage the inner and outer races 14 and 20. The connector 34 also defines a plurality of keyways 50 which allow the installation of the connector 34 after the bearings and retainers have been placed between the inner and outer races 20 and 14. Also shown is the relation of connector 34 with the segmented retainer 32.

Which of the cylindrical surfaces 22 and 24 will be engaged depends on the particular geometry of the segmented retainer 32 and, therefore, it depends on the particular application of the present invention. It is shown and preferred that the segmented retainer 32 engages the inner cylindrical surface 24 through contact with the retainer lower surface 52.

While the above description constitutes the preferred embodiment of the present invention, it will be appreciated that the invention is susceptible to modification, variation, and change without departing from the proper scope and fair meaning of the accompanying claims.

What is claimed is:

1. An overrunning roller/ramp clutch assembly comprising:

a drive member having a first cylindrical surface being rotatable about an axis:

a driven member having a second cylindrical surface coaxial with said first cylindrical surface and defining a gap therebetween;

a plurality of retainer members at spaced about locations in said gap, said retainer members having a pair of divergent ramped surfaces defining a groove in said retaining members;

a plurality of bearing balls positioned between said drive and driven members with one of said bearing balls being located within each of said retainer member grooves, said bearing balls having a diameter equal to the gap between said first and second cylindrical surfaces;

a connector interconnecting all of said retainer members together and causing said retainer members to circumferentially move in unison with one another, said connector being rotatable about said axis; and wherein acceleration of said drive member with respect to said driven member moves said balls along said retainer member ramped surfaces to a position where said balls engage said retainer member forcing said retainer members to contact and engage one of said drive and driven members preventing relative rotation between said drive and driven members and thereby transferring torque through said clutch assembly.

2. The assembly as set forth in claim 1 wherein said first cylindrical surface is concentric with and generally opposed said second cylindrical surface.

3. The assembly as set forth in claim 1 wherein said drive member is located radially outward of said driven member.

4. The assembly as set forth in claim 1 wherein said drive member is located radially inward of said driven member.

5. The assembly as set forth in claim 1 wherein said ramped surfaces are curved.

6. The assembly as set forth in claim 1 wherein each of said ramped surfaces are defined by at least two curved surfaces.

7. The assembly as set forth in claim 1 wherein each of said retainer members is defined by at least one curved lower surface having a radius about equal to the radius of the first cylindrical surface.

8. The assembly as set forth in claim 6 wherein said ramped surfaces are defined by at least two different radii of curvature.

9. The assembly as set forth in claim 1 wherein the bearing balls are capable of taking a locked or an unlocked position.

10. The assembly as set forth in claim 1 wherein the retainer members include a pair of parallel arm members disposed on either side of said bearing balls, said arm members defining a first and a second curved surface forming said pair of ramped surfaces, said first and second surfaces cooperating to define said groove therebetween.

11. The assembly as set forth in claim 10 wherein said curved surfaces engage said bearing balls.

12. The assembly as set forth in claim 11 wherein said curved surfaces cooperate to define a concave composite surface.

13. The assembly as set forth in claim 10 wherein the retainer members include an engaging side and a trailing side, the engaging said being generally adjacent to said drive member and said trailing side being generally adjacent said driven member, said engaging said having a radius of curvature.

14. An overrunning roller/ramp clutch assembly comprising:

a drive member having a first cylindrical surface being rotatable about an axis:

a driven member having a second cylindrical surface coaxial with said first cylindrical surface and defining a gap therebetween;

a plurality of retainer members at spaced about locations in said gap, said retainer members having ramped surfaces defining at least two concave surfaces and a groove in said segmented retaining members;

a plurality of bearing balls positioned between said drive and driven members with one of said bearing balls being located within each of said retainer member grooves, said bearing balls having a diameter equal to the gap between said first and second cylindrical surfaces;

a connector interconnecting all of said retainer members together and causing said retainer members to circumferentially move in unison with one another, said connector being rotatable about said axis;

wherein acceleration of said drive member with respect to said driven member moves said balls along said retainer member ramped surfaces to a position where said balls engage said retainer members forcing said retainer members to contact and engage one of said drive and driven members preventing relative rotation between said drive and driven members and thereby transferring torque through said clutch assembly.

15. The assembly as set forth in claim 14 wherein said first cylindrical surface is concentric with and generally opposed said second cylindrical surface.

16. The assembly as set forth in claim 14 wherein said drive member is located radially outward of said driven member.

17. The assembly as set forth in claim 14 wherein said drive member is located radially inward of said driven member.

18. The assembly as set forth in claim 14 wherein said retainer members each include a pair of said ramped surfaces.

19. The assembly as set forth in claim 14 wherein each of said retainer members is defined by at least one curved lower surface having a radius about equal to the radius of the first cylindrical surface.

20. The assembly as set forth in claim 14 wherein said ramped surfaces are defined by at least two different radii of curvature.

21. The assembly as set forth in claim 14 wherein the bearing balls are capable of taking a locked or an unlocked position.

22. The assembly as set forth in claim 14 wherein the retainer members include a pair of parallel arm members disposed on either side of said bearing balls, said arm members defining said ramped surfaces, said surfaces cooperatable to define said groove therebetween.

23. The assembly as set forth in claim 22 wherein said ramped surfaces engage said bearing balls.

24. The assembly as set forth in claim 23 wherein said ramped surfaces cooperate to define a concave composite surface.

25. The assembly as set forth in claim 22 wherein the retainer members include an engaging side and a trailing side, the engaging said being generally adjacent to said drive member and said trailing side being generally adjacent said driven member, said engaging said having a radius of curvature.

26. An overrunning roller/ramp clutch assembly comprising:

a drive member having a first cylindrical surface being rotatable about an axis:

a driven member having a second cylindrical surface coaxial with said first cylindrical surface and defining a gap therebetween;

a plurality of retainer members at spaced about locations in said gap, said retainer members having a pair of parallel arm members defining a groove therebetween, said arm members defining a first and a second curved surface;

a plurality of bearing balls positioned between said drive and driven members with one of said bearing balls being located within each of said retainer member grooves, said bearing balls having a diameter equal to the gap between said first and second cylindrical surfaces;

a connector interconnecting all of said retainer members together and, causing said retainer members to circumferentially move in unison with one another, said connector being rotatable about said axis; and wherein acceleration of said drive member with respect to said driven member moves said balls along said retainer curved surfaces to a position where said balls engage said retainer members forcing said retainers to contact and engage one of said drive and driven members preventing relative rotation between said drive and driven members and thereby transferring torque through said clutch assembly.

27. The assembly as set forth in claim 26 wherein said first cylindrical surface is concentric with and generally opposed said second cylindrical surface.

28. The assembly as set forth in claim 26 wherein said drive member is located radially outward of said driven member.

29. The assembly as set forth in claim 26 wherein said drive member is located radially inward of said driven member.

30. The assembly as set forth in claim 26 wherein said first and second curved surfaces are defined by at least two different radii of curvature.

31. The assembly as set forth in claim 26 wherein the bearing balls are capable of taking a locked or an unlocked position.

32. The assembly as set forth in claim 26 wherein said first and second curved surfaces engage said bearing balls.

33. The assembly as set forth in claim 26 wherein said first and second curved surfaces cooperate to define a concave composite surface.

34. The assembly as set forth in claim 26 wherein the retainer members include an engaging side and a trailing side, the engaging said being generally adjacent to said drive member and said trailing side being generally adjacent said driven member, said engaging said having a radius of curvature.

* * * * *